US008694659B1

(12) United States Patent
Stahl et al.

(10) Patent No.: US 8,694,659 B1
(45) Date of Patent: Apr. 8, 2014

(54) SYSTEMS AND METHODS FOR ENHANCING DOMAIN-NAME-SERVER RESPONSES

(75) Inventors: George Stahl, Santa Monica, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 850 days.

(21) Appl. No.: 12/754,904

(22) Filed: Apr. 6, 2010

(51) Int. Cl.
*G06F 15/16* (2006.01)

(52) U.S. Cl.
USPC ........... 709/229; 709/203; 709/217; 709/226; 709/227; 709/228; 709/230; 726/11; 726/14; 726/22; 380/23

(58) Field of Classification Search
USPC ......... 709/203, 217, 226–230, 238, 246, 250; 726/11, 14, 22; 340/5.8–5.86; 380/23
See application file for complete search history.

(56) References Cited

U.S. PATENT DOCUMENTS

| | | | | |
|---|---|---|---|---|
| 6,119,234 A * | 9/2000 | Aziz et al. | ........................ | 726/11 |
| 6,981,029 B1 * | 12/2005 | Menditto et al. | ............. | 709/217 |
| 7,437,482 B2 * | 10/2008 | Jungck | .......................... | 709/246 |
| 7,685,300 B2 * | 3/2010 | Burrows et al. | ............... | 709/230 |
| 7,925,782 B2 * | 4/2011 | Sivasubramanian et al. | . | 709/238 |
| 8,166,079 B2 * | 4/2012 | Lewin et al. | ................... | 707/803 |
| 8,239,571 B2 * | 8/2012 | Sivasubramanian et al. | . | 709/238 |
| 2002/0065938 A1 * | 5/2002 | Jungck et al. | ................. | 709/246 |
| 2002/0069278 A1 * | 6/2002 | Forslow | ........................ | 709/225 |
| 2004/0128346 A1 * | 7/2004 | Melamed et al. | .............. | 709/203 |
| 2005/0066011 A1 * | 3/2005 | Wicks | ............................ | 709/217 |
| 2006/0095585 A1 * | 5/2006 | Meijs et al. | ..................... | 709/245 |
| 2006/0253609 A1 * | 11/2006 | Andreev et al. | ................ | 709/245 |
| 2007/0067416 A1 * | 3/2007 | Gajda | ............................ | 709/217 |
| 2007/0094411 A1 * | 4/2007 | Mullane et al. | ................ | 709/245 |
| 2008/0147885 A1 * | 6/2008 | Bessis | ........................... | 709/250 |
| 2009/0157889 A1 * | 6/2009 | Treuhaft | ........................ | 709/230 |
| 2010/0088761 A1 * | 4/2010 | Podjarny et al. | ................. | 726/22 |
| 2010/0146132 A1 * | 6/2010 | Morris | ........................... | 709/229 |
| 2010/0186079 A1 * | 7/2010 | Nice et al. | ........................ | 726/14 |
| 2010/0281112 A1 * | 11/2010 | Plamondon | .................... | 709/203 |
| 2011/0153736 A1 * | 6/2011 | Sivasubramanian et al. | . | 709/203 |
| 2011/0153831 A1 * | 6/2011 | Mutnuru et al. | .............. | 709/226 |
| 2012/0036184 A1 * | 2/2012 | Chaudhari et al. | ............. | 709/203 |
| 2012/0311167 A1 * | 12/2012 | Feng et al. | ..................... | 709/229 |

* cited by examiner

*Primary Examiner* — Thu Ha Nguyen
(74) *Attorney, Agent, or Firm* — ALG Intellectual Property, LLC

(57) ABSTRACT

A computer-implemented method for enhancing domain-name-server responses may include: 1) receiving a domain-name-system request, 2) identifying a domain of the domain-name-system request, 3) retrieving classification information relating to the domain from a third-party system, and 4) including the classification information in a response to the domain-name-system request. Various other methods, systems, and computer-readable media are also disclosed.

16 Claims, 6 Drawing Sheets

SYSTEMS AND METHODS FOR ENHANCING DOMAIN-NAME-SERVER RESPONSES

BACKGROUND

Organizations face an ever-increasing number of distracting and harmful intrusions as their members use and navigate the Internet. Malicious, inappropriate, and/or irrelevant websites may consume precious network bandwidth and resources, serve to propagate malware within an organization, decrease productivity, and/or degrade an organization's work environment.

In order to address these problems, organizations may deploy a variety of endpoint security systems for monitoring, classifying, and/or filtering access to Internet resources. For example, when an endpoint user attempts to access an Internet resource (such as website), a traditional endpoint security system may make outbound requests to one or more information providers in an attempt to classify the Internet resource in order to decide whether to allow the user to access the resource. Unfortunately, such outbound requests may add unwanted latency to the user's attempt to access the Internet resource. Accordingly, the instant disclosure identifies a need for enhancing domain-name-server responses.

SUMMARY

As will be described in greater detail below, the instant disclosure generally relates to systems and methods for enhancing domain-name-server responses. In one example, one or more of the various systems described herein may accomplish this task by: 1) receiving a domain-name-system request, 2) identifying a domain of the domain-name-system request, 3) retrieving classification information relating to the domain from a third-party system, and then 4) including the classification information in a response to the domain-name-system request.

The classification information may include a variety of information, such as a rating, a trust level, and/or a content category. Retrieving the classification information may include a variety of steps. For example, retrieving the classification information may include: 1) identifying an Internet classification provider, 2) transmitting information identifying the domain to the Internet classification provider, and 3) receiving the classification information from the Internet classification provider. In one example, identifying the Internet classification provider may include identifying a plug-in for the Internet classification provider.

In some examples, retrieving the classification information may include: 1) identifying a time-to-live value for the classification information, 2) determining that the time-to-live value for the classification information has not expired, and 3) retrieving the classification information from a local cache. In various examples, the domain-name-system request may be made within a domain-name-system hierarchy and the third-party system may include a system outside of the domain-name-system hierarchy.

Including the classification information in the response to the domain-name-system request may include a variety of steps. For example, including the classification information in the response may include including the classification information in a text record in the response. Additionally or alternatively, including the classification information in the response may include: 1) identifying a time-to-live value for the classification information and 2) including the time-to-live value for the classification information in the response. In some examples, including the time-to-live value in the response may include: 1) identifying a time-to-live value for a resolution of the domain, 2) determining that the time-to-live value for the classification information is less than the time-to-live value for the resolution of the domain, and 3) using the time-to-live value for the classification information as the time-to-live value for the resolution of the domain in the response. In other examples, including the time-to-live value in the response may include including the time-to-live value for the classification information as a separate record within the response.

As will be described in greater detail below, by including classification information for domains in responses to domain-name-system requests for the domains, the systems and methods described herein may provide information required by endpoint security products without requiring the endpoint security products to make separate queries to third parties. This may conserve network resources, reduce latency (e.g., by caching the information on a domain-name-system server), as well as offload network traffic from the third parties.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
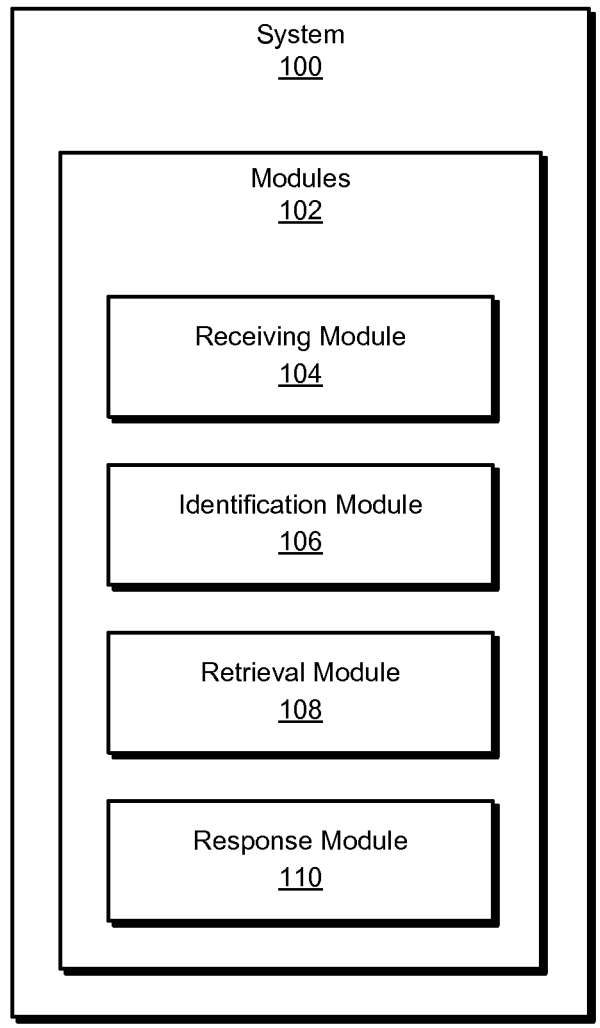
FIG. 1 is a block diagram of an exemplary system for enhancing domain-name-server responses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for enhancing domain-name-server responses. In one example, the various systems described herein may accomplish this task by: 1) receiving a domain-name-system request, 2) identifying a domain of the domain-name-system request, 3) retrieving classification information relating to the domain from a third-party system, and then 4) including the classification information in a response to the domain-name-system request.

Figure 2:
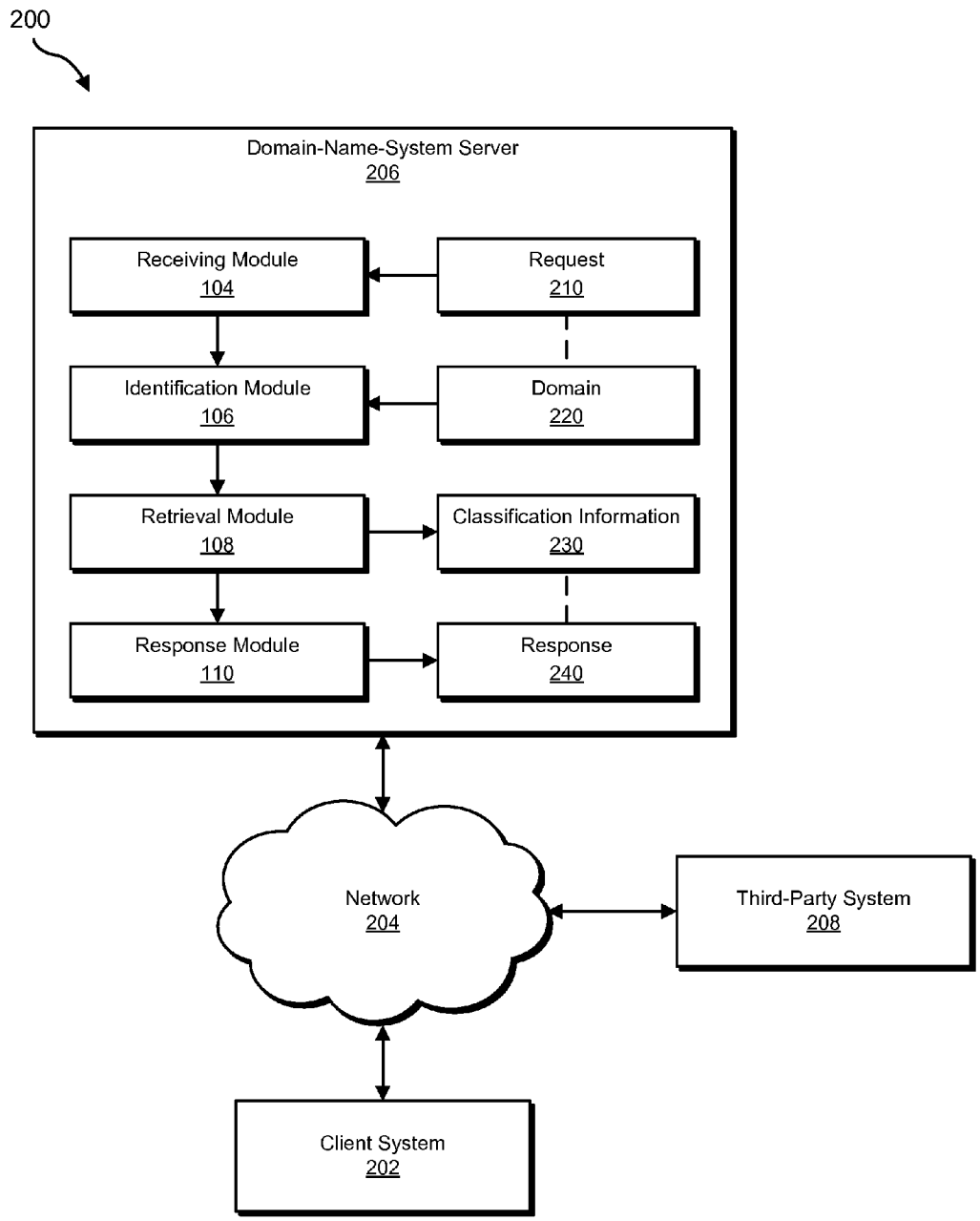
FIG. 2 is a block diagram of an exemplary system for enhancing domain-name-server responses.
Figure 3:
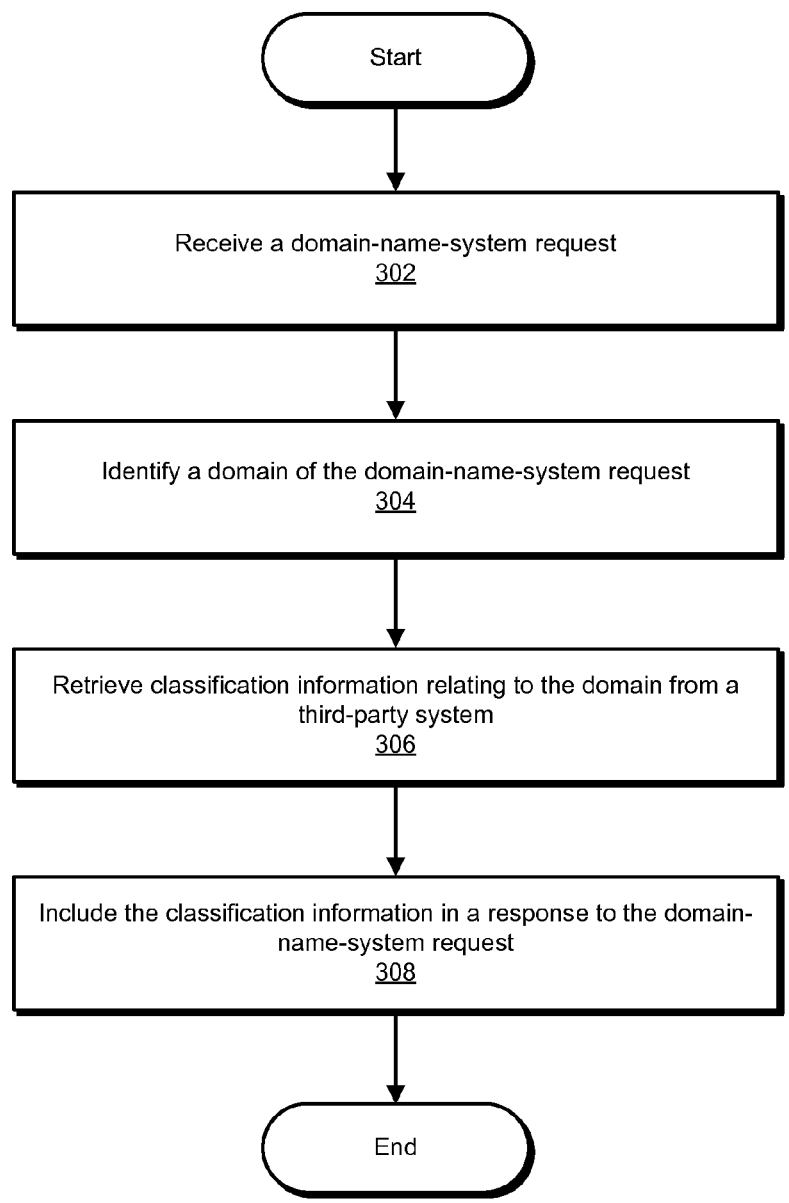
FIG. 3 is a flow diagram of an exemplary method for enhancing domain-name-server responses.
Figure 4:
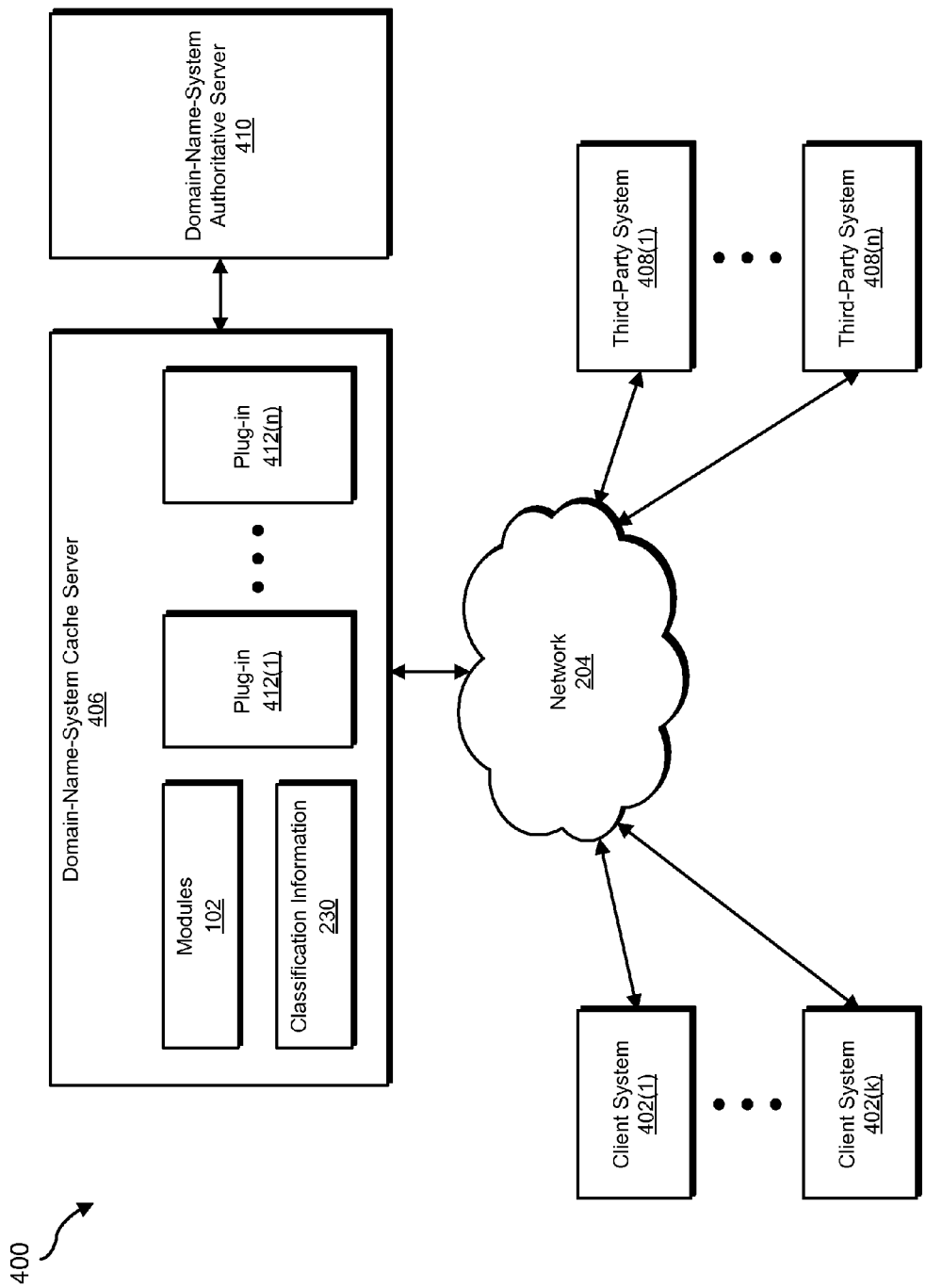
FIG. 4 is a block diagram of an exemplary system for enhancing domain-name-server responses.

The following will provide, with reference to FIGS. 1, 2, and 4, detailed descriptions of exemplary systems for enhancing domain-name-server responses. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enhancing domain-name-server responses. As illustrated in this figure, exemplary system 100 may include one or more modules 102 for performing one or more tasks. For example, and as will be explained in greater detail below, exemplary system 100 may include a receiving module 104 programmed to receive a domain-name-system request. Exemplary system 100 may also include an identification module 106 programmed to identify a domain associated with the domain-name-system request. Exemplary system 100 may further include a retrieval module 108 programmed to retrieve classification information relating to the domain from a third-party system.

In addition, and as will be described in greater detail below, exemplary system 100 may include a response module 110 programmed to include the classification information in a response to the domain-name-system request. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client system 202, domain-name-system server 206, and/or third-party system 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client system 202 in communication with a domain-name-system server 206 via a network 204. In one embodiment, and as will be described in greater detail below, modules 102 from FIG. 1 may program domain-name-system server 206 to: 1) receive a domain-name-system request (e.g., domain-name-system server may receive a request 210 from client system 202), 2) identify a domain of the domain-name-system request (e.g., a domain 220), 3) retrieve classification information (e.g., classification information 230) relating to the domain from a third-party system (e.g., from a third-party system 208), and then 4) include the classification information in a response to the domain-name-system request (e.g., a response 240).

Client system 202 generally represents any type or form of computing device capable of reading computer-executable instructions. Examples of client system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Domain-name-system server 206 generally represents any type or form of computing device that is capable of handling domain name system requests (e.g., resolving hostnames to IP addresses). Examples of domain-name-system server 206 include, without limitation, application servers and caching domain-name-system servers.

Third-party system 208 generally represents any type or form of computing device capable of reading computer-executable instructions. Examples of third-party system 208 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between client system 202, domain-name-system server 206, and/or third-party system 208.

FIG. 3 is a flow diagram of an exemplary computer-implemented method 300 for enhancing domain-name-server responses. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may receive a domain-name-system request. For example, at step 302 receiving module 104 may, as part of domain-name-system server 206 in FIG. 2, receive request 210 from client system 202. As used herein, the term "domain-name-system request" may refer to any request and/or query to a domain-name-system server. For example, a domain-name-system request may include a request to resolve a domain name to an IP address.

Receiving module 104 may perform step 302 in any suitable manner. In one example, receiving module 104 may receive the domain-name-system request directly from a client system. In other examples, receiving module 104 may receive the domain-name-system request in a message from a portion of a domain-name-system server. For example, receiving module 104 may receive the domain-name-system request from a network filter driver configured to intercept domain-name-system requests.

At step 304, one or more of the systems described herein may identify a domain of the domain-name-system request. For example, at step 304 identification module 106 may, as part of domain-name-system server 206 in FIG. 2, identify domain 220 of request 210. As used herein, the term "domain" may refer to any domain and/or hostname that may be sent as part of a request and/or query to a domain-name-system server.

Identification module 106 may perform step 304 in any suitable manner. For example, identification module 106 may identify the domain of the domain-name-system request by parsing the domain-name-system request for the domain. For example, identification module 106 may identify the domain as "www.google.com", "www.wellsfargo.com", etc.

At step 306, one or more of the systems described herein may retrieve classification information relating to the domain from a third-party system. For example, retrieval module 108 may, as part of domain-name-system server 206 in FIG. 2, retrieve classification information 230 from third-party system 208.

As used herein, the term "classification information" may refer to any information that a third party may provide about a domain (e.g., beyond information pertaining to resolving a domain name to an IP address). For example, the classification information may include a rating of the domain. Such a rating may indicate the reliability of a site or sites hosted at the domain, the popularity of a site hosted at the domain, the frequency of updates to a site hosted at the domain, and/or any other metric potentially of interest to the client system and/or an application (such as a security application) on the client system.

Additionally or alternatively, the classification information may include a trust level corresponding to the domain. In this example, the trust level may indicate the security of a site hosted at the domain (e.g., as against malware, phishing, etc.), the level of moderation of a site hosted at the domain, the reliability of outbound links from a site hosted at the domain, etc.

In some examples, the classification information may include a content category of a site hosted at the domain. For example, if the domain is "www.google.com", the content category may include "search." Likewise, if the domain is "www.wellsfargo.com", the content category may include "banking." Other examples of content categories may include "food", "automotive", "sports", "textiles", etc. In some examples, the classification information may include other categories descriptive of the domain, such as "public", "private", etc.

In some embodiments, the classification information may include information geared for certain applications installed on client systems. For example, an anti-phishing application on a client system may be configured to recognize a "banking" category in the classification information.

Retrieval module 108 may perform step 306 in a variety of ways. For example, retrieval module 108 may retrieve the classification information by: 1) identifying an Internet classification provider (e.g., on the third-party system), 2) transmitting information identifying the domain to the Internet classification provider, and later 3) receiving the classification information from the Internet classification provider. As used herein, the term "Internet classification provider" may refer to any service, interface, module, system, and/or party that provides classification information for a domain. For example, Internet classification providers may include anti-malware services, rating services, trust services, etc.

In some examples, retrieval module 108 may identify the Internet classification provider by identifying a plug-in for the Internet classification provider. As used herein, the term "plug-in" may refer to any plug-in, extension, add-on, module, and/or configuration data for indicating, locating, and/or providing access to an Internet classification provider. As an example, FIG. 4 illustrates an exemplary system 400 with a domain-name-system cache server 406 connected to third-party systems 408(1)-(n) via network 204. As illustrated in this figure, domain-name-system server 406 may include plug-ins 412(1)-(n) corresponding to third-party systems 408(1)-(n), respectively. Retrieval module 108 may identify third-party system 408(1) as an Internet classification provider by identifying a plug-in 412(1) for retrieving information from third-party system 408(1).

In some examples, the plug-in may include executable instructions for retrieving the classification information from the Internet classification provider. Additionally or alternatively, the plug-in may include a location of the third-party system acting as the Internet classification provider.

Retrieval module 108 may transmit the information identifying the domain to the Internet classification provider in any suitable manner. For example, retrieval module 108 may use a published Application Programming Interface ("API") implemented by the Internet classification provider. For example, retrieval module 108 may use a web interface in the following format:

[URL]?domain=[DOMAIN]

For example, if a service of the Internet classification provider were hosted at "www.secure.com/dnstxt" and the domain in the DNS request were "www.wellsfargo.com", retrieval module 108 may generate the following web-based request:

http://www.secure.com/dnstxt?domain=www.wellsfargo.com

In some examples, retrieval module 108 may retrieve the classification information from the third-party system by retrieving a cached copy of the classification information that came from the third-party system. For example, retrieval module 108 may: 1) identify a time-to-live value for the classification information, 2) determine that the time-to-live value for the classification information has not expired, and then 3) retrieve the classification information from a local cache. As used herein, a "time-to-live value" may refer to any value indicating how long information may be relied upon and/or how long information may be cached before needing to update and/or refresh the information. For example, a "time-to-live value" may include one or more values stored in HTTP headers, such as a "Cache-Control" header and/or an "Expires" header.

Retrieval module 108 may identify the time-to-live value for the classification information in any suitable manner. For example, retrieval module 108 may parse an HTTP message that contained the classification information returned by the third-party system. For example, retrieval module 108 may parse the HTTP message for "Cache-Control" and/or "Expires" headers. In some embodiments, retrieval module 108 may have previously determined the time-to-live value for the classification information (e.g., by parsing an HTTP message containing the classification information) and stored the time-to-live value in a local cache. In these embodiments, retrieval module 108 may identify the time-to-live value by accessing the time-to-live value from the local cache.

Upon determining that the time-to-live value for the classification information has not expired, retrieval module 108 may retrieve the classification information from the local cache. For example, retrieval module 108 may store responses from third-party systems in a database. Retrieval module 108 may then verify that information for a domain currently at issue has not expired, and accordingly retrieve the information from the database. For example, if the domain in the domain-name-system request is "www.wellsfargo.com", retrieval module 108 may consult the database to determine that classification information for "www.wellsfargo.com" has previously been retrieved, and that this classification information has not yet expired. Retrieval module 108 may accordingly retrieve the classification information from the database rather than retrieving the classification information directly from the third-party system again.

Using FIG. 4 as an example, retrieval module 108 may retrieve classification information 230 as cached on domain-name-system cache server 406 rather than retrieving classification information 230 directly from third-party systems 408(1)-(n) again. This may save time, thereby reducing latency experienced on a client system. Additionally, retrieving the classification information from a local cache rather than the third-party system may reduce the load on the third-party system. As such, the methods and systems described herein may allow for Internet classification providers that are created and maintained by parties with modest resources. For example, by allowing the Internet classification providers to set a time-to-live value for classification information and only querying the Internet classification providers once per domain per time-to-live period, Internet classification providers may leverage the resources of a domain-name-system server rather than handling traffic from all interested clients (e.g., classification information 230 cached locally on domain-name-system cache server 406 in FIG. 4 may server client systems 402(1)-(k) rather than requiring client systems 402(1)-(k) to individually request classification information from third-party systems 408(1)-(n)).

In some examples, the domain-name-system request may be made within a domain-name-system hierarchy. In these examples, the third-party system may include a system outside the domain-name-system hierarchy. Using FIG. 4 as an example, client system 402(1) may transmit a domain-name-system request to domain-name-system cache server 406, which may be configured to refresh domain resolution information from domain-name-system authoritative server 410. Accordingly, the domain-name-system hierarchy for client system 402(1) may include domain-name-system cache server 406 and authoritative server 410. However, third-party systems 408(1)-(n) may exist outside of this hierarchy.

Returning to FIG. 3, at step 308 one or more of the systems described herein may include the classification information in a response to the domain-name-system request. For example, at step 308 response module 110 may, as part of domain-name-system server 206 in FIG. 2, include classification information 230 in response 240 to client system 202.

Response module 110 may perform step 308 in any suitable manner. For example, response module 110 may include the classification information in the response by including the classification information in a text record in the response. As used herein, the term "text record" (or "TXT record") may refer to any record and/or field in a response to a domain-name-system request capable of holding arbitrary data relating to the domain (e.g., classification information).

In some examples, response module 110 may place a time-to-live value on the classification information. For example, response module 110 may identify a time-to-live value for the classification information and then include the time-to-live value for the classification information in the response. Response module 110 may identify the time-to-live value in any suitable manner. For example, response module 110 may identify a time-to-live value assigned to the classification information by the third-party system. Additionally or alternatively, response module 110 may select a time-to-live value for the classification information. For example, response module 110 may have gathered classification information from several third-party systems. Each third-party system may have assigned a different time-to-live value to its respective classification information. In this example, response module 110 may select the smallest time-to-live value.

As another example, response module 110 may identify a time-to-live value for a resolution of the domain (e.g., how long an IP address may be associated with the domain before the domain-name-system server must refresh its information from an authoritative name server). Response module 110 may then determine that the time-to-live value for the classification information is less than the time-to-live value for the resolution of the domain. Response module 110 may accordingly use the time-to-live value for the classification information as the time-to-live value for the resolution of the domain in the response. In this manner, a client program may seek to refresh all information relating to the domain when any of the information expires.

Rather than reducing various time-to-live values to a single time-to-live value for the response, response module 110 may include the time-to-live value for the classification information in the response by including the time-to-live value for the classification information as a separate record within the response (e.g., in a TXT record associated with a TXT record for the classification information).

As described above, by including classification information for domains in responses to domain-name-system requests for the domains, the systems and methods described herein may provide information required by endpoint security products without requiring the endpoint security products to make separate queries to third parties. This may conserve network resources, reduce latency (e.g., by caching the information on a domain-name-system server), as well as offload network traffic from the third parties. For example, a client system may request that a domain-name-system server return an address for "www.wellsfargo.com". The domain-name-system server may not only fetch the address, but may also apply various plug-ins registered in the server to the domain to fetch information about the domain. The domain-name-server may then respond to the domain-name-system request with the address of "www.wellsfargo.com" as well as information such as "Trusted Public Corporation", "Bank", "Shasta Trust Verification", "No Malware", etc.

Figure 5:
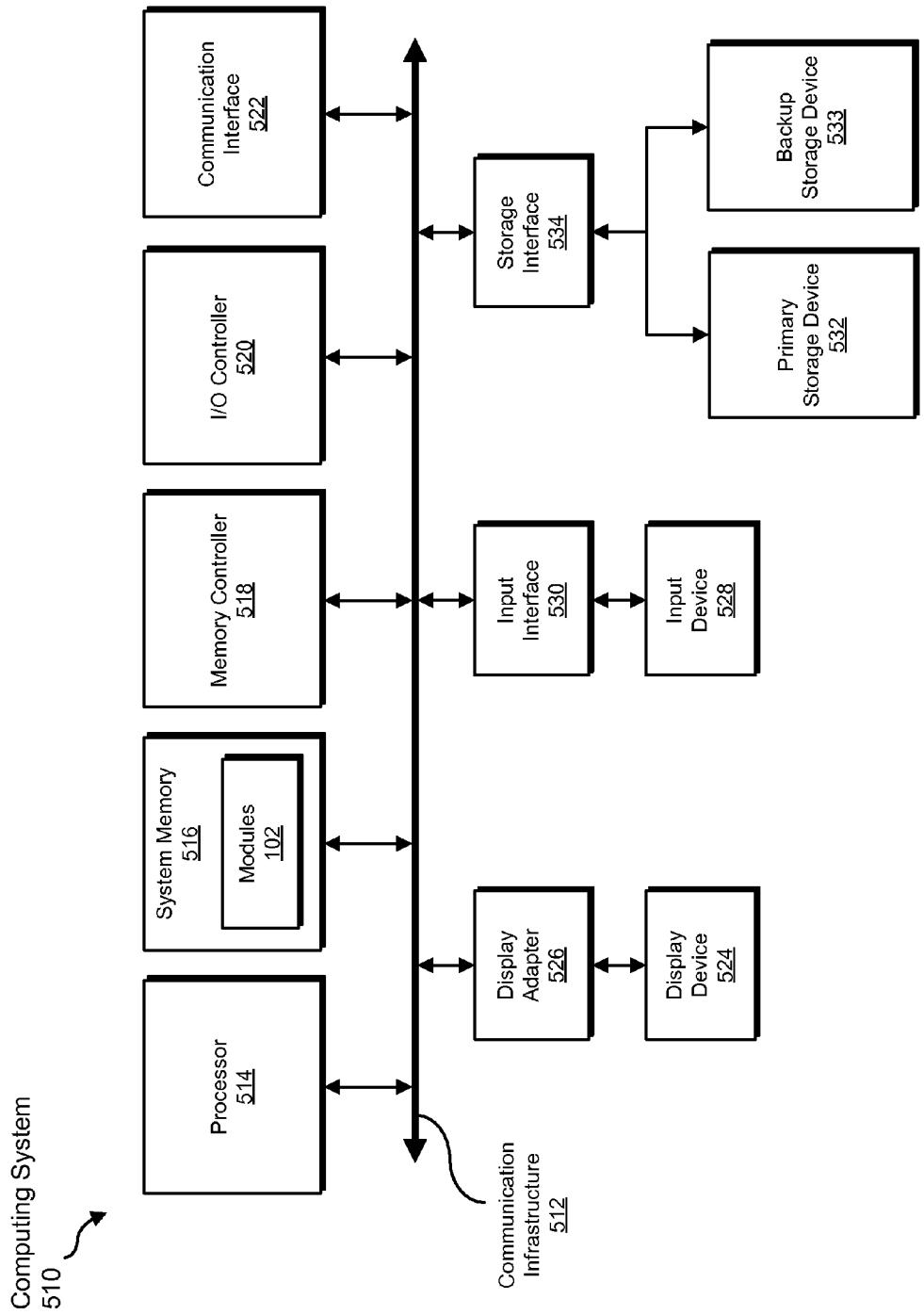
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, identifying, retrieving, including, transmitting, determining, and/or using steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as receiving, identifying, retrieving, including, transmitting, determining, and/or using.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, identifying, retrieving, including, transmitting, determining, and/or using steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, identifying, retrieving, including, transmitting, determining, and/or using steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, identifying, retrieving, including, transmitting, determining, and/or using steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the receiving, identifying, retrieving, including, transmitting, determining, and/or using steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
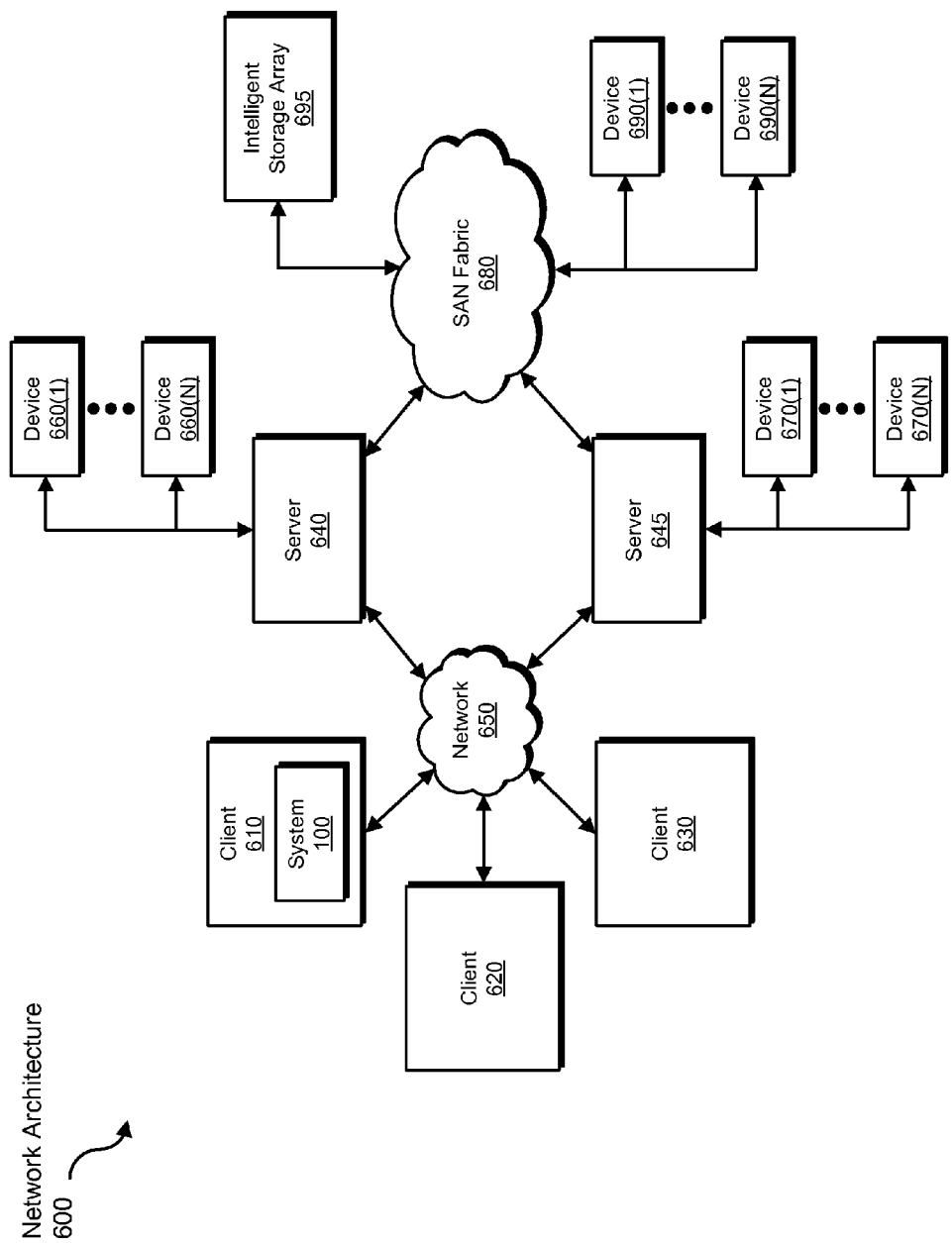
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, identifying, retrieving, including, transmitting, determining, and/or using steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for enhancing domain-name-server responses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a domain-name-system server into a system for enhancing domain-name-system responses.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enhancing domain-name-server responses, at least a portion of the method being performed by a computing device comprising at least one processor, the method comprising:
   receiving a domain-name-system request;
   identifying a domain of the domain-name-system request;
   retrieving classification information relating to the domain from a third-party system, wherein the classification information comprises information that is separate from or additional to information that is required to resolve the IP address;
   including both the information required to resolve the IP address and the classification information in a response to the domain-name-system request;
   identifying a time-to-live value for the classification information;
   including the time-to-live value for the classification information in the response by:
      identifying a time-to-live value for a resolution of the domain;
      determining that the time-to-live value for the classification information is less than the time-to-live value for the resolution of the domain;
      using the time-to-live value for the classification information as the time-to-live value for the resolution of the domain in the response.

2. The computer-implemented method of claim 1, wherein retrieving the classification information comprises:
   identifying an Internet classification provider;
   transmitting information identifying the domain to the Internet classification provider;
   receiving the classification information from the Internet classification provider.

3. The computer-implemented method of claim 2, wherein identifying the Internet classification provider comprises identifying a plug-in for the Internet classification provider.

4. The computer-implemented method of claim 1, wherein retrieving the classification information comprises:
   identifying a time-to-live value for the classification information;
   determining that the time-to-live value for the classification information has not expired;
   retrieving the classification information from a local cache.

5. The computer-implemented method of claim 1, wherein including the time-to-live value for the classification information in the response comprises including the time-to-live value for the classification information as a separate record within the response.

6. The computer-implemented method of claim 1, wherein the classification information comprises at least one of:
   a rating;
   a trust level;
   a content category.

7. The computer-implemented method of claim 1, wherein including the classification information in the response comprises including the classification information in a text record in the response.

8. The computer-implemented method of claim 1, wherein:
   the domain-name-system request is made within a domain-name-system hierarchy;
   the third-party system comprises a system outside of the domain-name-system hierarchy.

9. A system for enhancing domain-name-server responses, the system comprising:
   a receiving module programmed to receive a domain-name-system request;

an identification module programmed to identify a domain of the domain-name-system request;

a retrieval module programmed to retrieve classification information relating to the domain from a third-party system, wherein the classification information comprises information that is separate from or additional to information that is required to resolve the IP address;

a response module programmed to:
- include both the information required to resolve the IP address and the classification information in a response to the domain-name-system request;
- identify a time-to-live value for the classification information;
- include the time-to-live value for the classification information in the response by:
  - identifying a time-to-live value for a resolution of the domain;
  - determining that the time-to-live value for the classification information is less than the time-to-live value for the resolution of the domain;
  - using the time-to-live value for the classification information as the time-to-live value for the resolution of the domain in the response;

at least one processor configured to execute the receiving module, the identification module, the retrieval module, and the response module.

10. The system of claim 9, wherein the retrieval module is programmed to retrieve the classification information by:
- identifying an Internet classification provider;
- transmitting information identifying the domain to the Internet classification provider;
- receiving the classification information from the Internet classification provider.

11. The system of claim 10, wherein the retrieval module is programmed to identify the Internet classification provider by identifying a plug-in for the Internet classification provider.

12. The system of claim 9, wherein the retrieval module is programmed to retrieve the classification information by:
- identifying a time-to-live value for the classification information;
- determining that the time-to-live value for the classification information has not expired;
- retrieving the classification information from a local cache.

13. The system of claim 9, wherein the response module is programmed to include the time-to-live value for the classification information in the response by including the time-to-live value for the classification information as a separate record within the response.

14. The system of claim 9, wherein the classification information comprises at least one of:
- a rating;
- a trust level;
- a content category.

15. The system of claim 9, wherein the response module is programmed to include the classification information in the response by including the classification information in a text record in the response.

16. A non-transitory computer-readable-storage medium comprising one or more computer-executable instructions that, when executed by at least one processor of a computing device, cause the computing device to:
- receive a domain-name-system request;
- identify a domain of the domain-name-system request;
- retrieve classification information relating to the domain from a third-party system, wherein the classification information comprises information that is separate from or additional to information that is required to resolve the IP address;
- include both the information required to resolve the IP address and the classification information in a response to the domain-name-system request;
- identify a time-to-live value for the classification information;
- include the time-to-live value for the classification information in the response by:
  - identifying a time-to-live value for a resolution of the domain;
  - determining that the time-to-live value for the classification information is less than the time-to-live value for the resolution of the domain;
  - using the time-to-live value for the classification information as the time-to-live value for the resolution of the domain in the response.

* * * * *